INVENTORS
EDWIN E. ARNOLD,
JOHN S. NEWTON.
BY
ATTORNEY

Patented June 7, 1949

2,472,559

UNITED STATES PATENT OFFICE 2,472,559

PLANETARY GEARING

Edwin E. Arnold, Pittsburgh, and John S. Newton, Lansdowne, Pa., assignors to Westinghouse Electric Corporation, East Pittsburgh, Pa., a corporation of Pennsylvania Application July 24, 1946, Serial No. 685,840

7 Claims. (Cl. 74—291)

The invention relates to planetary gearing of the two-speed type and it has for an object to provide apparatus of this character wherein one speed is effected by clutching together the planet carrier and the orbit gear and the other speed is obtained by applying a brake to the orbit gear.

A more particular object of the invention is to provide planetary gearing having an orbit gear encompassed by an annular brake drum splined or slidably keyed thereto together with a multiple disk clutch for connecting the planet carrier and the brake drum, means for effecting relative axial movement of the orbit gear and brake drum to connect and disconnect the clutch, and frictional brake means cooperating with the brake drum.

Figure 1:
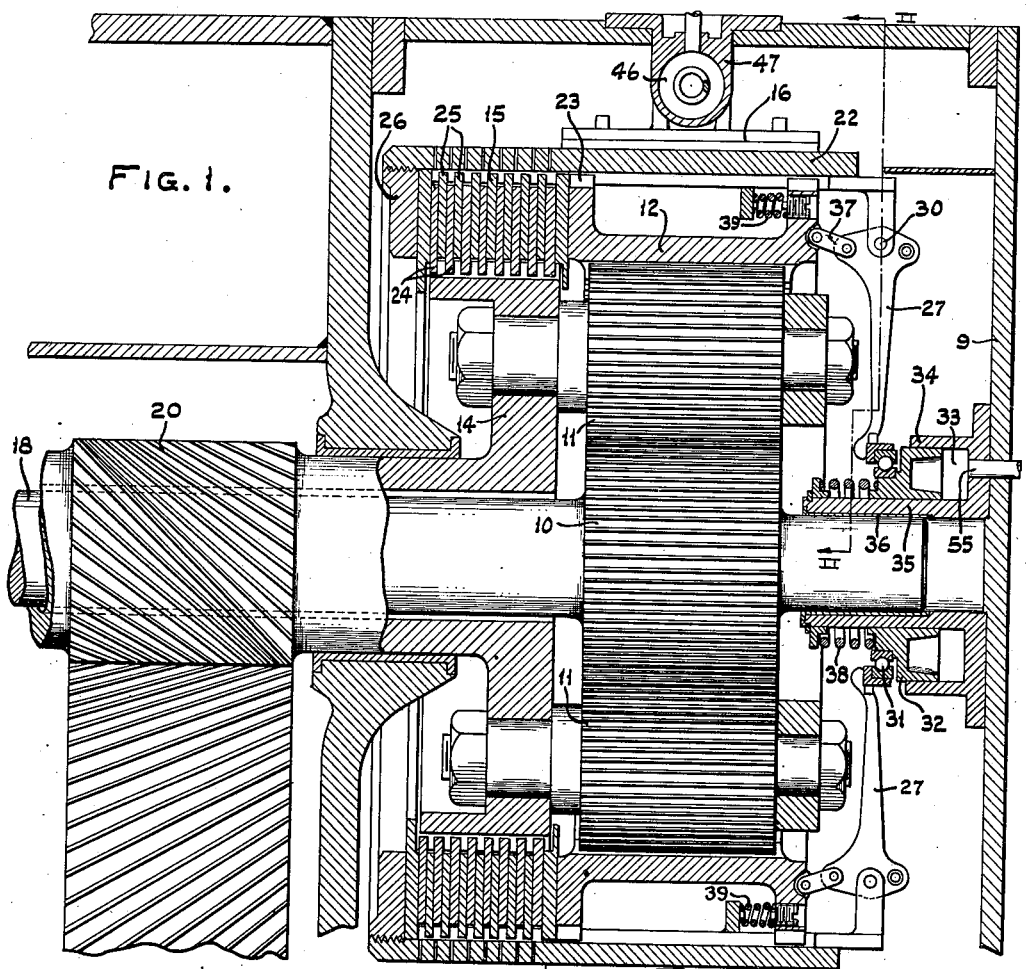
Figure 2:
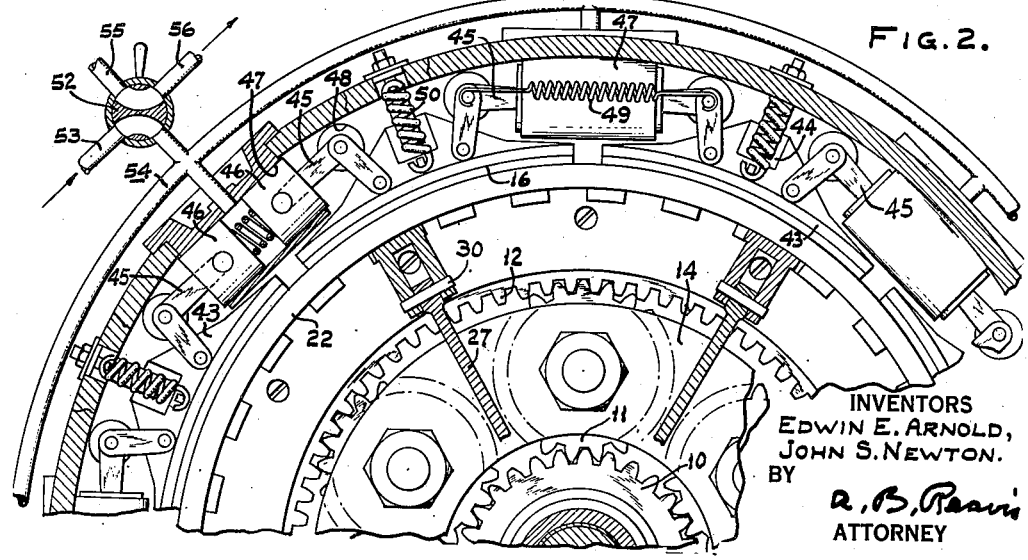

The foregoing and other objects are effected by the invention as will be apparent from the following description and claims taken in connection with the accompanying drawings, forming a part of this application, in which Fig. 1 is an axial sectional view of the improved gearing; and Fig. 2 is a transverse sectional view of apparatus shown in Fig. 1.

In the drawings, the gear case encloses the improved gearing comprising the sun gear 10 meshing with planet pinions 11, which mesh with the orbit gear 12.

The planet pinions are mounted on a carrier 14. A clutch 15 is operative to connect the planet carrier and the orbit gear to lock together the elements of the planetary train as a unit, and frictional brake means 16 is effective to hold the orbit bear against rotation.

With said arrangement, either the sun gear or the planet carrier may be the driving element and the other thereof the driven element. For example, the sun gear 10 may be connected to a turbine quill shaft 18 and the planet carrier may be connected to the quill pinion 20 of a reduction gear so that, with a given turbine speed, the quill pinion may be driven in the same direction at the same speed or in the same direction at a less speed.

The orbit gear 12 is encompassed by a brake drum annulus 22 having a splined or a slidably keyed or toothed connection 23 with respect thereto.

The clutch 15 includes disks 24 keyed to the planet carrier and alternate disks 25 are keyed to the brake drum. The brake drum has an inwardly-extending flange 26 and the clutch disks are interposed between the latter and the orbit gear. Movement of the brake drum annulus in one direction axially of the orbit gear clamps the disks for clutch connection, and movement thereof in the other direction frees the disks for clutch disconnection.

The brake drum annulus and the orbit gear are moved relatively axially by any suitable mechanism which operates to act on the gear and to react on the brake drum. In Figs. 1 and 2, a circumferential series of radial levers 27 have their outer ends pivotally connected, at 30, to the brake drum annulus 22. The levers extend radially inward and have their inner ends connected to the thrust bearing 31 attached to the collar or annular piston 32 slidable in the annular cylinder 33 provided by the sleeve elements 34 and 35 connected to the housing 9, the inner sleeve element housing the quill shaft bearing 36. Thrust elements, for example, toggle links 37, are interposed between the levers and the orbit gear. Motive fluid is admitted to the annular cylinder 33 to move the annular piston outward to clamp the disks for clutch connection. On the other hand, when motive fluid is permitted to exhaust from the cylinder, the piston is moved by the spring 38 to release the clutch pressure. Springs 39 between the brake drum and the orbit gear act thereon to separate the clutch disks.

While any suitable brake means may be used with the annular brake drum 22, we prefer to use the type disclosed in the patent to Arnold, No. 2,464,960, March 22, 1949, in which a circumferential series of shoes 43 connected by radial tongue-and-slot connections 44 to the housing 9 are operated hydraulically to develop equalized braking effort. Briefly, toggle links 45 are pivotally connected to the shoes and to opposed pistons 46 in cylinders 47 carried by the housing; and the outer ends of the toggle links bear against the cylindrical cam surface 48 provided on the interior of the housing 9. Pressure of motive fluid admitted to the cylinders between the pistons acts on the latter for operation of the toggle links to engage the friction shoes with the brake drum annulus. When the cylinder spaces are permitted to exhaust, springs 49 move the toggle links to relieve the toggle pressure and springs 50 move the shoes outwardly to define running clearance for the drum.

With the clutch connected, the brake is released and vice versa. As shown in Fig. 2, a valve 52 is operative to supply liquid under pressure to clutch cylinder 33 and to connect the brake cylinders 47 to drain and vice versa. More particularly, the valve 52 is operative to place the pressure connection 53 in communication with the brake cylinder manifold 54 while the clutch cylinder passage 55 is placed in communication with the drain passage 56 or to place the latter in communication with the brake cylinder manifold while the clutch cylinder passage is placed in communication with the pressure supply connection.

While the invention has been shown in but one form, it will be obvious to those skilled in the art that it is not so limited, but is susceptible of various changes and modifications without departing from the spirit thereof.

What is claimed is:

1. In planetary gearing, a sun gear, an orbit gear, planet pinions meshing with the sun and orbit gears, a carrier for the planet pinions, a brake drum encompassing the orbit gear, said orbit gear being capable of axial movement, a slidable coupling between the drum and the orbit gear, a clutch for connecting the carrier and the brake drum and operated by relative axial movement of the orbit gear, pressure-responsive operating means for moving the orbit gear and the drum relatively in one direction to connect the clutch, a spring for moving the orbit gear and the drum relatively in the other direction for disconnecting the clutch, braking means for the brake drum, pressure-responsive operating means for engaging the braking means with the drum, and means for applying fluid under pressure to either of said operating means and for releasing such pressure from the other operating means.

2. In planetary gearing, a sun gear, an orbit gear, planet pinions meshing with the sun and orbit gears, a carrier for the planet pinions, a brake drum encompassing the orbit gear, a slidable coupling between the drum and the orbit gear, a multiple-disk clutch including disks alternately keyed to the carrier and to the brake drum, means responsive to relative axial movements of the orbit gear and the brake drum for clamping together and unclamping the disks for clutch connection and disconnection, pressure-responsive operating means for moving the orbit gear and the drum relatively in one direction for engagement of the disks to connect the clutch, a spring for moving the orbit gear and the drum relatively in the other direction for disengaging the disks to disconnect the clutch, braking means cooperating with the brake drum, pressure-responsive operating means for engaging the braking means with the drum, and means for applying fluid under pressure to either operating means and for releasing such pressure from the other operating means.

3. In planetary gearing, a sun gear, an orbit gear, planet pinions meshing with the sun and orbit gears, a carrier for the planet pinions, a brake drum encompassing the orbit gear, a slidable coupling between the drum and the orbit gear, said brake drum having an inwardly-extending flange, a multiple-disk clutch including disks alternately keyed to the carrier and to the brake drum and interposed between the flange and the orbit gear, braking means cooperating with the brake drum, pressure-responsive operating means for moving the orbit gear and the brake drum relatively in one direction to engage the disks to connect the clutch, a spring for moving the orbit gear and the drum relatively in the other direction to disengage the disks to disconnect the clutch, pressure-responsive operating means for engaging the braking means with the drum, and means for applying fluid under pressure to either operating means and relieving such pressure from the other operating means.

4. In planetary gearing, a sun gear; an orbit gear; a plurality of planet pinions meshing with the sun and orbit gears; a brake drum encompassing the orbit gear; a slidable coupling between the brake drum and the orbit gear; said brake drum having an inwardly-extending flange; a multiple-disk clutch including disks alternately keyed to the carrier and to the brake drum and interposed between the flange and the orbit gear; braking means cooperating with the brake drum; means for moving the brake drum and the orbit gear relatively axially to clamp and unclamp the disks for clutch connection and disconnection; said last-named means including a circumferential series of levers pivotally connected at their outer ends to the brake drum, thrust elements between the levers and the orbit gear, spring means for moving the levers in one direction to release the clutch, and pressure-responsive operating means connected to the inner ends of the levers for moving the latter in the other direction to engage the clutch; pressure-responsive operating means for engaging the braking means with the brake drum; and means for applying fluid under pressure to either operating means and releasing such pressure from the other operating means.

5. In planetary gearing, a sun gear; an orbit gear; planet pinions meshing with the sun and orbit gears; a carrier for the planet pinions; a brake drum encompassing the orbit gear; a slidable coupling between the brake drum and the orbit gear; said brake drum having an inwardly-extending flange; a multiple-disk clutch including disks alternately keyed to the carrier and to the brake drum and interposed between the flange and the orbit gear; means for moving the orbit gear and the brake drum relatively axially to clamp and unclamp the disks for clutch connection and disconnection; said last-named means including a circumferential series of levers pivotally connected at their outer ends to the brake drum, thrust elements between the levers and the orbit gear, a collar operatively connected to the inner ends of the levers and mounted for movement axially of the sun gear, means providing for application of fluid under pressure to the collar to move the latter to connect the clutch, and spring means acting on the collar in the direction to move the latter to disconnect the clutch; brake means cooperating with the brake drum; operating means responsive to application of fluid under pressure to engage the braking means with the drum; and valve means operative to apply fluid under pressure to said collar and to release application thereof to said operating means and vice versa.

6. In planetary gearing, a casing; a sun gear; an orbit gear; planet pinions meshing with the sun and orbit gears; a carrier for the planet pinions; a brake drum encompassing the orbit gear; means for slidably coupling the drum and the orbit gear; said brake drum having an inwardly-extending flange; a multiple-disk clutch including disks alternately keyed to the carrier and to the brake drum and interposed between said flange and the orbit gear; means for moving the brake drum and the orbit gear relatively axially to clamp and unclamp the disks for clutch connection and disconnection; said last-named means including a circumferential series of levers having their outer ends pivotally connected to the brake drum, thrust elements between the levers and the orbit gear, an actuating collar mounted on the casing for movement axially of the sun gear, a thrust bearing between the collar and the inner ends of the levers, means providing for the application of fluid pressure to the collar for moving the latter to connect the clutch, a spring acting on the collar for moving the latter in a direction to disconnect the clutch; a circumferential series of brake shoes mounted on the casing for movement radially of the brake drum; operating means responsive to fluid pressure for moving the shoes radially to engage the brake drum; and means providing for application of fluid pressure to said collar and for release thereof from said operating means and vice versa.

7. In planetary gearing, a casing, a sun gear, an orbit gear, planet pinions meshing with the sun and orbit gears, a carrier for the planet pinions, an annular brake drum encompassing the orbit gear, a slidable coupling between the drum and the orbit gear, a multiple-disk clutch including disks alternately keyed to the carrier and to the brake drum, spring means for disengaging the disks, means including a piston cooperating with a cylinder carried by the casing for effecting relative axial movement of the brake drum annulus and the internal gear against the force of said spring means to clamp the disks for connection of the cluch, a circumferential series of brake shoes for the brake drum, spring means for disengaging the brake shoes from the drum, means for engaging the shoes with the drum, said last-named means including pistons operatively connected to the shoes and arranged in cylinders carried by the casing, and means including a valve provided with drain ports and operable to supply fluid under pressure to the clutch cylinder and to connect the brake cylinders to a drain port or to supply fluid under pressure to the latter cylinders and connect the clutch cylinder to a drain port.

EDWIN E. ARNOLD.
JOHN S. NEWTON.

REFERENCES CITED

The following references are of record in the file of this patent:

UNITED STATES PATENTS

| Number | Name | Date |
| --- | --- | --- |
| 1,794,044 | Tuttle | Feb. 24, 1931 |
| 2,331,684 | Henningsen | Oct. 12, 1943 |
| 2,373,122 | La Brie | Apr. 10, 1945 |
| 2,435,633 | Newton | Feb. 10, 1948 |